US012663005B2

(12) United States Patent     (10) Patent No.:   US 12,663,005 B2

Smith et al.     (45) Date of Patent:    Jun. 23, 2026

(54) POWER END OF RECIPROCATING PUMP

(71) Applicant: GD Energy Products, LLC, Tulsa, OK (US)

(72) Inventors: Laramie Rose Smith, Owasso, OK (US); Adam Bradley Avey, Tulsa, OK (US); Timo Waldhoer, Tahlequah, OK (US); Randall Turner Hall, Jr., Claremore, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 187 days.

(21) Appl. No.: 18/509,718

(22) Filed: Nov. 15, 2023

(65) Prior Publication Data

US 2025/0154949 A1     May 15, 2025

(51) Int. Cl.

| | |
|---|---|
| F04B 53/16 | (2006.01) |
| B33Y 80/00 | (2015.01) |
| F04B 9/02 | (2006.01) |
| F04B 19/22 | (2006.01) |
| F04B 1/0404 | (2020.01) |
| F04B 1/0538 | (2020.01) |
| F04B 17/05 | (2006.01) |

(52) U.S. Cl.
CPC .............. *F04B 53/16* (2013.01); *F04B 19/22* (2013.01); *B33Y 80/00* (2014.12); *F04B 1/0404* (2013.01); *F04B 1/0538* (2013.01); *F04B 9/02* (2013.01); *F04B 17/05* (2013.01)

(58) Field of Classification Search
CPC .......... F04B 17/05; F04B 19/22; F04B 53/16; F04B 1/0404; F04B 1/053–0538; F04B 9/02–047; B33Y 80/00

USPC ............................................... 92/73; 417/273
See application file for complete search history.

(56) References Cited

U.S. PATENT DOCUMENTS

| | | | |
|---|---|---|---|
| 3,595,101 A | * | 7/1971 | Cooper, Sr. ........... F16C 19/546 |
| | | | 74/596 |
| D759,728 S | | 6/2016 | Byrne et al. |
| D791,192 S | | 7/2017 | Byrne et al. |
| D791,193 S | | 7/2017 | Byrne et al. |
| 9,879,659 B2 | | 1/2018 | Kumar et al. |
| 10,087,992 B2 | | 10/2018 | Bayyouk et al. |
| 10,393,182 B2 | | 8/2019 | Byrne et al. |
| D870,156 S | | 12/2019 | Byrne et al. |
| D870,157 S | | 12/2019 | Byrne et al. |

(Continued)

FOREIGN PATENT DOCUMENTS

| | | |
|---|---|---|
| CA | 3187352 A1 | 12/2021 |
| CN | 112360714 A | 2/2021 |

(Continued)

OTHER PUBLICATIONS

Lewa, Lewa triplex process pumps for high-pressure processes, Feb. 9, 2023, 4 pages.

*Primary Examiner* — Alexander B Comley

(74) *Attorney, Agent, or Firm* — Edell, Shapiro & Finnan, LLC

(57) ABSTRACT

A power end frame of a reciprocating pump includes a first ring, a second ring, and a plurality of connections extending between the first ring and the second ring. The first ring, the second ring, and the plurality of connections are integral with one another, and the plurality of connections includes a plurality of struts that form a plurality of open cells between the first ring and the second ring.

20 Claims, 9 Drawing Sheets

(56) References Cited

U.S. PATENT DOCUMENTS

| | | | | |
|---|---|---|---|---|
| 10,520,037 | B2 | 12/2019 | Kumar et al. | |
| 10,677,244 | B2 * | 6/2020 | Byrne | B21K 23/00 |
| 10,871,227 | B1 * | 12/2020 | Belshan | F04B 1/053 |
| 11,162,479 | B2 | 11/2021 | Thomas et al. | |
| 11,204,030 | B2 | 12/2021 | Kumar et al. | |
| 11,208,996 | B2 | 12/2021 | Foster et al. | |
| 11,300,111 | B2 | 4/2022 | Thomas et al. | |
| 11,346,339 | B2 | 5/2022 | Nowell et al. | |
| 11,359,615 | B2 | 6/2022 | Thomas et al. | |
| 11,480,170 | B2 * | 10/2022 | Byrne | F04B 37/00 |
| 11,560,884 | B2 | 1/2023 | Thomas et al. | |
| 11,578,711 | B2 | 2/2023 | Thomas et al. | |
| 11,635,068 | B2 | 4/2023 | Foster et al. | |
| 11,635,151 | B2 | 4/2023 | Foster et al. | |
| 11,644,018 | B2 | 5/2023 | Thomas et al. | |
| 11,686,296 | B2 | 6/2023 | Son et al. | |
| 11,773,843 | B2 * | 10/2023 | Pham | F04B 53/16 |
| | | | | 417/521 |
| 2016/0025089 | A1 * | 1/2016 | Kumar | F16C 9/02 |
| | | | | 92/161 |
| 2016/0177945 | A1 * | 6/2016 | Byrne | F04B 1/0404 |
| | | | | 184/6 |
| 2017/0363081 | A1 * | 12/2017 | Kerr | F04B 53/16 |
| 2019/0032720 | A1 | 1/2019 | Bayyouk et al. | |
| 2019/0136840 | A1 * | 5/2019 | Kumar | F04B 1/0404 |
| 2019/0277341 | A1 | 9/2019 | Byrne et al. | |
| 2020/0141401 | A1 * | 5/2020 | Kumar | F16C 9/02 |
| 2020/0332788 | A1 | 10/2020 | Cui et al. | |
| 2020/0386221 | A1 * | 12/2020 | Pham | F04B 53/14 |
| 2020/0400132 | A1 * | 12/2020 | Kumar | F04B 39/122 |
| 2021/0123434 | A1 * | 4/2021 | Cui | F04B 1/0439 |
| 2021/0301807 | A1 | 9/2021 | Cui et al. | |
| 2021/0341079 | A1 | 11/2021 | Thomas et al. | |
| 2022/0235751 | A1 | 7/2022 | Thomas et al. | |
| 2022/0282725 | A1 | 9/2022 | Nowell et al. | |
| 2022/0389916 | A1 | 12/2022 | Keith et al. | |
| 2022/0397107 | A1 | 12/2022 | Thomas et al. | |
| 2023/0003207 | A1 | 1/2023 | Foster et al. | |
| 2023/0012666 | A1 | 1/2023 | Keith et al. | |
| 2023/0022890 | A1 | 1/2023 | Thomas et al. | |
| 2023/0036956 | A1 * | 2/2023 | Louzon | F04B 53/006 |
| 2023/0039253 | A1 | 2/2023 | Kumar et al. | |
| 2023/0047066 | A1 | 2/2023 | Barnett et al. | |
| 2023/0050603 | A1 | 2/2023 | Foster et al. | |
| 2023/0160382 | A1 | 5/2023 | Thomas et al. | |
| 2023/0193887 | A1 | 6/2023 | Thomas et al. | |
| 2023/0213032 | A1 * | 7/2023 | Shampine | F04B 53/006 |
| | | | | 417/321 |

FOREIGN PATENT DOCUMENTS

| | | | | |
|---|---|---|---|---|
| DE | 202020104533 | U1 * | 9/2020 | B62D 29/041 |
| WO | 2021257570 | A1 | 12/2021 | |

* cited by examiner

802  FORM A RING

804  FORM A CONNECTION THAT IS INTEGRAL WITH THE RING

806  FORM A STAND THAT IS INTEGRAL WITH THE RING

808  FORM A NOSE PLATE THAT IS INTEGRAL WITH THE RING

800

POWER END OF RECIPROCATING PUMP

TECHNICAL FIELD

The present disclosure relates to the field of high pressure reciprocating pumps and, in particular, to a power end of high pressure reciprocating pumps.

BACKGROUND

High pressure reciprocating pumps are often used to deliver high pressure fluids during earth drilling operations. Generally, a reciprocating pump includes a power end and a fluid end. The power end can generate forces sufficient to cause the fluid end to deliver high pressure fluids to earth drilling operations. For example, the power end may include a crankshaft that drives a plurality of reciprocating plungers or pistons near or within the fluid end to pump fluid at high pressure. The power end also includes a frame that supports and encloses components of the power end, such as the crank shaft. The frame is arranged to withstand stress (e.g., a mechanically induced stress, a hydraulically induced stress) being produced during operation of the reciprocating pump to enable desirable performance of the reciprocating pump.

SUMMARY

The present application relates to a power end frame of a reciprocating pump. The techniques discussed herein may be embodied as a power end frame and a method for manufacturing a power end frame of a reciprocating pump.

More specifically, in accordance with one embodiment, the present application is directed to a power end frame. The power end frame includes a first ring, a second ring, and a plurality of connections extending between the first ring and the second ring. The first ring, the second ring, and the plurality of connections are integral with one another, and the plurality of connections includes a plurality of struts that form a plurality of open cells between the first ring and the second ring.

In accordance with another embodiment, the present application is directed to a method of manufacturing a power end frame of a reciprocating pump. The method includes forming a plurality of rings and forming a plurality of connections that extend between and are integral with adjacent rings of the plurality of rings. The plurality of connections includes a plurality of struts that form a plurality of cells between the plurality of struts.

In accordance with yet another embodiment, the present application is directed to a power end frame. The power end frame includes a plurality of rings and a plurality of connections integral with the plurality of rings. The plurality of connections includes a plurality of struts extending between adjacent rings of the plurality of rings, and each strut of the plurality of struts extends obliquely from at least one ring of the plurality of rings.

The foregoing advantages and features will become evident in view of the drawings and detailed description.

BRIEF DESCRIPTION OF THE DRAWINGS

To complete the description and in order to provide for a better understanding of the present application, a set of drawings is provided. The drawings form an integral part of the description and illustrate embodiments of the present application, which should not be interpreted as restricting the scope of the disclosure, but just as examples. The drawings comprise the following figures.

Like reference numerals have been used to identify like elements throughout this disclosure.

DETAILED DESCRIPTION

The following description is not to be taken in a limiting sense but is given solely for the purpose of describing the broad principles of the disclosure. Embodiments of the disclosure will be described by way of example, with reference to the above-mentioned drawings showing elements and results according to the present disclosure.

Generally, the present application is directed to a power end frame of a reciprocating pump. The power end frame includes multiple rings (e.g., bearing rings) and integral connections. For example, the connections may extend between adjacent rings to couple the adjacent rings to one another. In some embodiments, the power end frame is formed using an additive manufacturing process in which the rings and the connections are integrally formed with one another. The power end frame having the integral rings and connections may provide structural integrity benefits, such as by removing or reducing a number of potentially weak interfaces at which separate components connect with one another. Additionally, integral formation of the rings and connections may simplify manufacturing of the power end frame at least because it may eliminate, or at least reduce, the need to manufacture separate components, to couple the separate components to one another, and/or to inspect and test the separate components and/or the couplings.

Moreover, the connections may be arranged to provide open cells to reduce an amount of material utilized to form the power end frame, thereby reducing a cost associated with manufacture of the power end frame. For example, the connections may include struts that extend between the rings, and the struts may be offset from one another to define the open cells between adjacent struts. Additionally, each strut may extend obliquely with respect to the ring(s) to which the strut is connected to provide sufficient structural rigidity and strength. As such, the connections limit material usage while enabling the power end frame to withstand stress produced during operation of the reciprocating pump.

Figure 1:
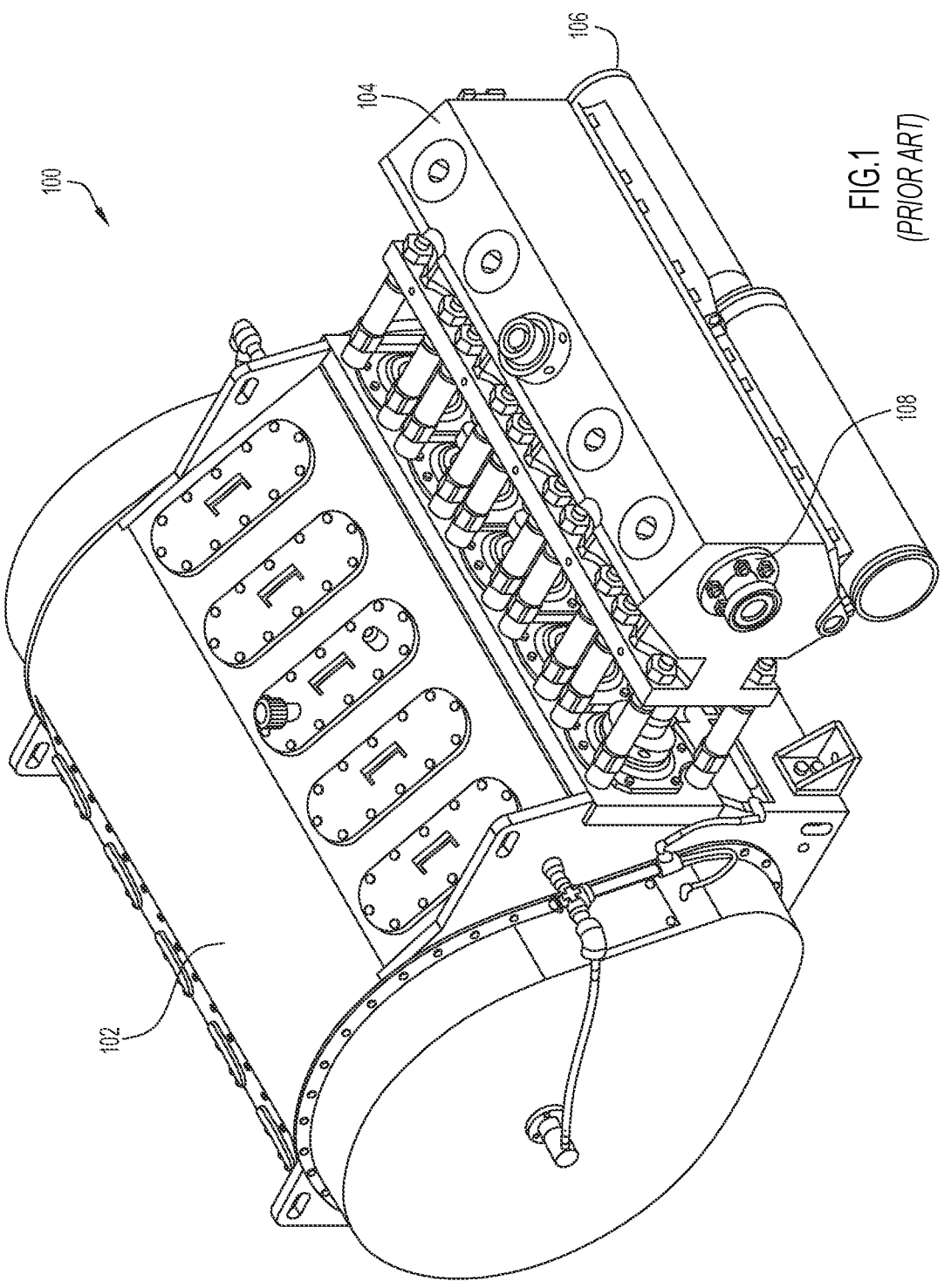
FIG. 1 is a front perspective view of a prior art reciprocating pump including a fluid end and a power end.

Referring to FIG. 1, a prior art reciprocating pump 100 is illustrated. The reciprocating pump 100 includes a power end 102 and a fluid end 104. The power end 102 includes a crankshaft that drives a plurality of reciprocating plungers or pistons (generally referred to as "reciprocating elements") within the fluid end 104 to pump fluid at high pressure (e.g., to cause the fluid end 104 to deliver high pressure fluids to earth drilling operations). For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting, and the present application may be applicable to both fracking and drilling operations, as well as any other suitable operations.

In any case, often, the reciprocating pump 100 may be quite large and may, for example, be supported by a semi-tractor truck ("semi") that can move the reciprocating pump 100 to and from a well. Specifically, in some instances, a semi may move the reciprocating pump 100 off a well to perform maintenance on the reciprocating pump 100. However, a reciprocating pump 100 is typically moved off a well only when a replacement pump (and an associated semi) is available to move into place at the well, which may be rare. Thus, often, the reciprocating pump 100 is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, extend the time between maintenance operations (i.e., between downtime), and/or minimize the time to complete maintenance operations (minimizing downtime) are highly desirable.

Figure 2A:
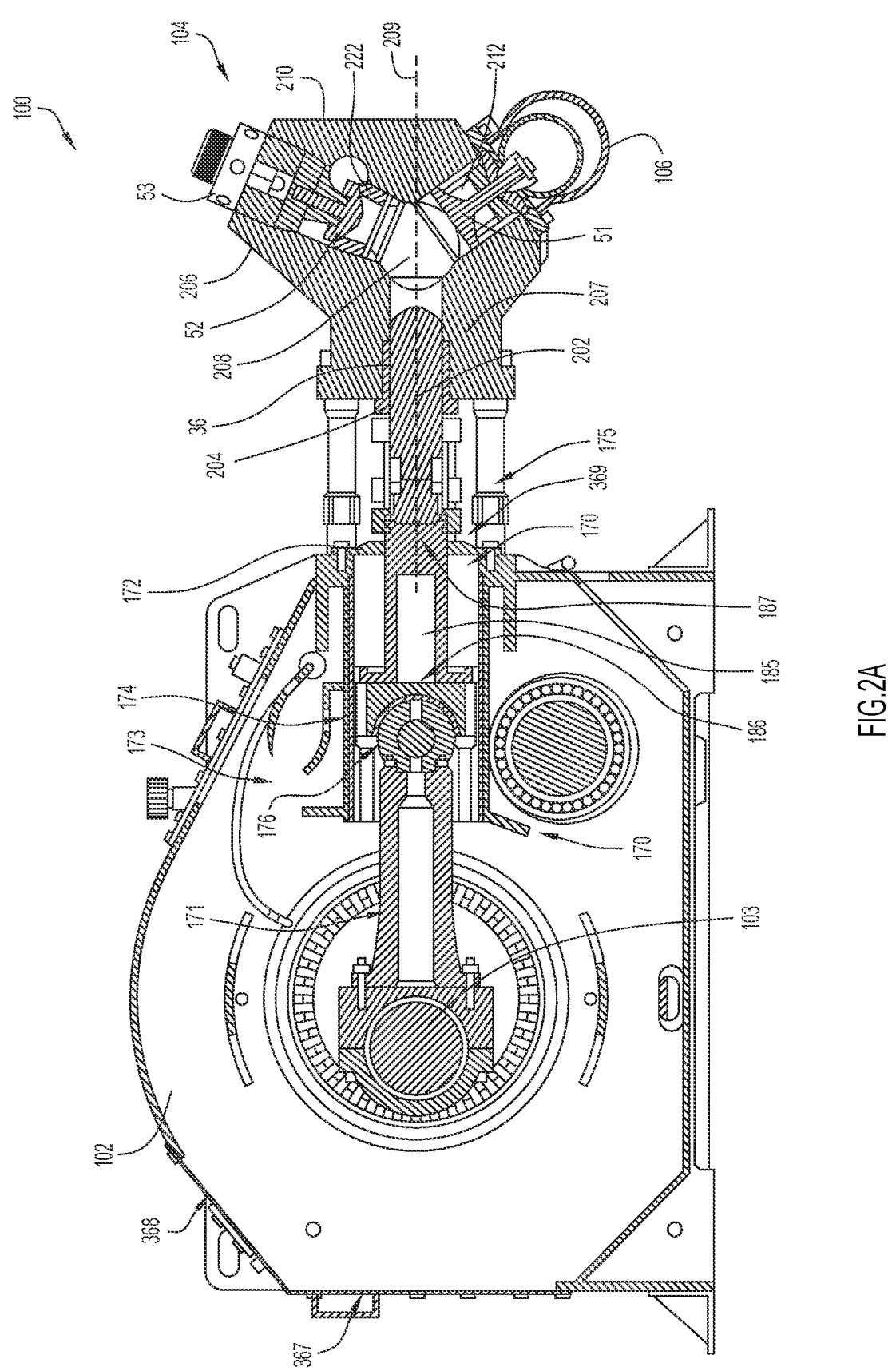
FIG. 2A is a side cross-sectional view of the prior art reciprocating pump of FIG. 1.

Still referring to FIG. 1, but now in combination with FIG. 2A, the reciprocating pump 100 pumps fluid into and out of pumping chambers 208. FIG. 2A shows a side, cross-sectional view of reciprocating pump 100 taken along a central axis 209 of one of the reciprocating elements 202 included in reciprocating pump 100. Thus, FIG. 2A depicts a single pumping chamber 208. However, it should be understood that a fluid end 104 can include multiple pumping chambers 208 arranged side-by-side. In fact, in at least some embodiments (e.g., the embodiment of FIG. 1), a casing 206 of the fluid end 104 forms a plurality of pumping chambers 208, and each pumping chamber 208 includes a reciprocating element 202 that reciprocates within the casing 206. However, side-by-side pumping chambers 208 need not be defined by a single casing 206. For example, in some embodiments, the fluid end 104 may be modular, and different casing segments may house one or more pumping chambers 208. In any case, the one or more pumping chambers 208 are arranged side-by-side so that corresponding conduits are positioned adjacent to each other and generate substantially parallel pumping action. Specifically, with each stroke of the reciprocating element 202, low pressure fluid is drawn into the pumping chamber 208 and high pressure fluid is discharged. During these operations, movement of the crankshaft 103, movement of the reciprocating element 202, and/or flow of fluid, as well as other moving parts, components, and/or flows, may generate stress at the power end 102. The stress can affect a structural integrity of the power end 102. Therefore, maintenance operations (e.g., inspection, replacement, repair) may be performed with respect to the power end 102 to ensure continued operation of the reciprocating pump 100.

In various embodiments, the fluid end 104 may be shaped differently and/or have different features, but may still generally perform the same functions, define similar structures, and house similar components. For example, while the fluid end 104 includes a first bore 204 that intersects an inlet bore 212 and an outlet bore 222 at skewed angles, other fluid ends may include any number of bores arranged along any desired angle or angles, for example, to intersect the first bore 204 (and/or an access bore) substantially orthogonally and/or so that two or more bores are substantially coaxial. Generally, the bores 212 and 222, as well as any other bores (i.e., segments, conduits, etc.), may intersect to form a pumping chamber 208, may be cylindrical or non-cylindrical, and may define openings at an external surface 210 of the casing 206. Additionally, the bores 212 and 222, as well as any other bores (i.e., segments, conduits, etc.), may receive various components or structures, such as sealing assemblies or components thereof.

In the depicted embodiment, the inlet bore 212 defines a fluid path through the fluid end 104 that connects the pumping chamber 208 to a piping system 106 delivering fluid to the fluid end 104. Meanwhile, the outlet bore 222 allows compressed fluid to exit the fluid end 104. Thus, in operation, the bores 212 and 222 may include valve components 51 and 52, respectively, (e.g., one-way valves) that allow the bores 212 and 222 to selectively open and deliver a fluid through the fluid end 104. Typically, valve components 51 in the inlet bore 212 may be secured therein by a piping system 106 (see FIG. 1). Meanwhile, valve components 52 in outlet bore 222 may be secured therein by a closure assembly 53 that, in the prior art example illustrated in FIG. 2A, is removably coupled to the fluid end 104 via threads.

In operation, fluid may enter fluid end 104 via outer openings of inlet bores 212 and exit fluid end 104 via outer openings of outlet bores 222. More specifically, fluid may enter inlet bores 212 via pipes of piping system 106, flow through the pumping chamber 208 (due to reciprocation of a reciprocating elements 202), and then through the outlet bores 222 into a channel 108 (see FIG. 1). However, the piping system 106 and the channel 108 are merely example conduits and, in various embodiments, the fluid end 104 may receive and discharge fluid via any number of pipes and/or conduits, along pathways of any desirable size or shape.

Meanwhile, each of the first bores 204 defines, at least in part, a cylinder for reciprocating elements 202 and/or connects the casing 206 to a cylinder for reciprocating elements 202. More specifically, in the illustrated embodiment, a casing segment 207 houses a packing assembly 36 configured to seal against a reciprocating element 202 disposed interiorly of the packing assembly 36. Reciprocation of a reciprocating element 202 in or adjacent to the first bore 204, which may be referred to as a reciprocation bore (or, for fracking applications, a plunger bore), draws fluid into the pumping chamber 208 via the inlet bore 212 and pumps the fluid out of the pumping chamber 208 via the outlet bore 222. To help provide access to these parts and/or the pumping chamber 208, such as for performing maintenance operations, some fluid ends 104 have access bores that are often aligned with (and sometimes coaxial with) the first bore 204. Other fluid ends 104 need not include an access bore and, thus, such an access bore is not illustrated in FIGS. 1 and 2A.

Regardless of whether the fluid end 104 includes an access bore, the packing assembly 36 typically is to be replaced from an outer opening of the first bore 204 (i.e., a side of the first bore 204 aligned with the external surface 210 of the casing 206). At the same time, to operate properly, the fluid end 104 is to be securely and stably coupled to the power end 102. Thus, often, with prior art reciprocating pumps like the reciprocating pump 100, the fluid end 104 is directly coupled to the power end 102 with relatively short couplers 175, and at least a portion of the reciprocating pump 100 is to be disassembled to access the first bore 204, e.g., to replace packing assembly 36.

Figure 2B:
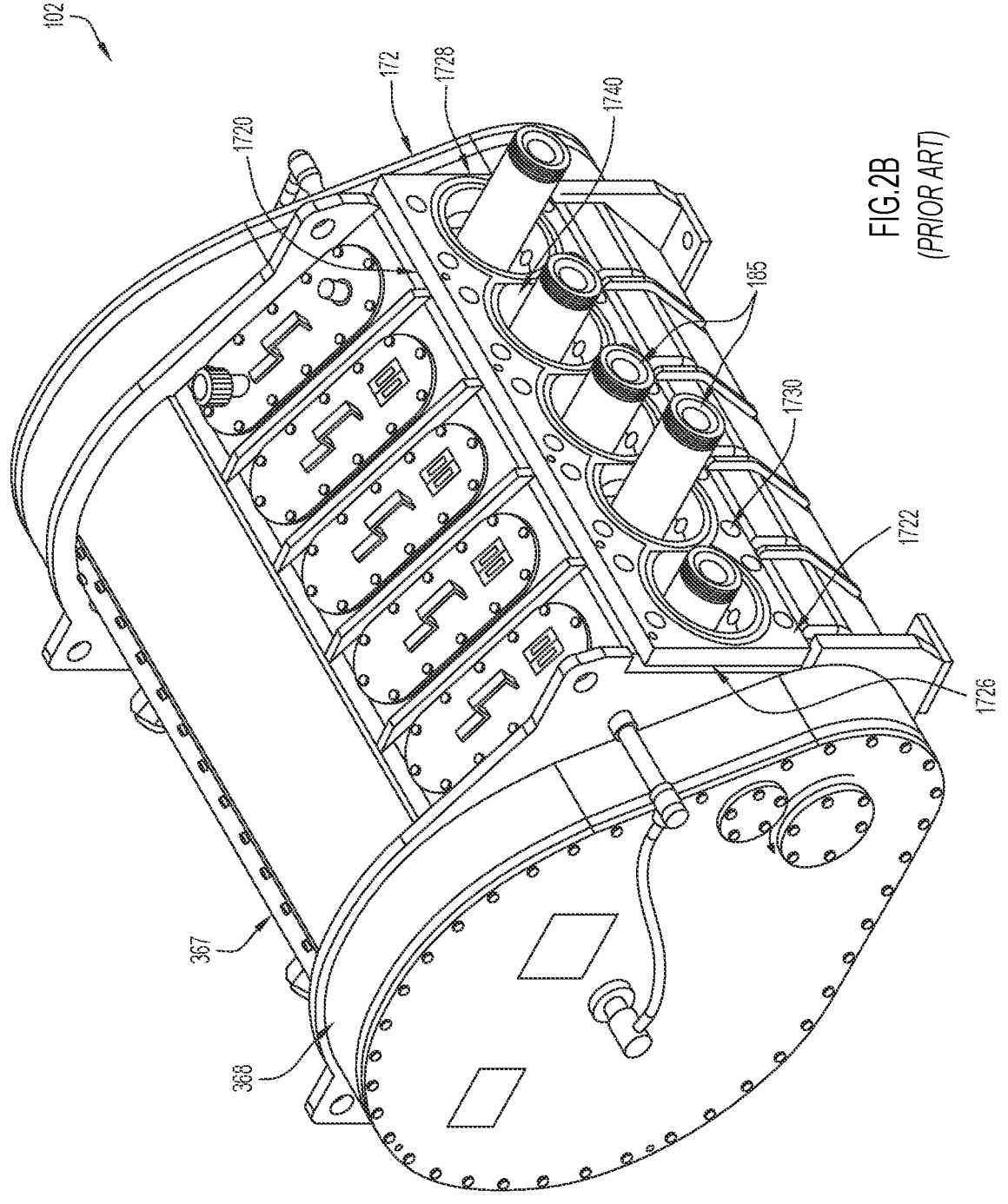
FIG. 2B is a front perspective view of the prior art power end of FIG. 1.

Now turning to FIGS. 2A and 2B, in the depicted prior art reciprocating pump 100, the couplers 175 (e.g., tie rods, which are sometimes referred to as stay rods) are threaded to a nose plate 172 of a crosshead assembly 170 of the power end 102 to position the fluid end 104 in close proximity to the power end 102. More specifically, with the prior art power end 102, the locations at which a fluid end 104 may be coupled to the power end 102 are fixed and/or preset by a set of receptacles 1730. In this particular prior art power end 102, the nose plate 172 defines the locations of receptacles 1730 for the power end 102 (which is positioned at and/or generally defines a front of the power end 102). However, in other embodiments, the receptacles 1730 could be included in any part or portion of a power end. That is, the power end 102 may include a frame 368 that extends from a front 369 to a back 367, and the receptacles 1730 may generally be included in the front 369 of frame 368. The receptacles 1730 can be seen in FIG. 2B, which shows the power end 102 disconnected from the fluid end 104, e.g., during maintenance of the packing assembly 36 included in the fluid end 104. FIG. 2B also shows how, in this particular embodiment, the nose plate 172 extends from a first end 1726 to a second end 1728 and also extends from a back surface 1720 to a front surface 1722.

In the depicted embodiment, the receptacles 1730 extend into the nose plate 172 from the front surface 1722 and are generally disposed around pony rod holes 1740. However, in other embodiments, the receptacles 1730 need not be positioned as such. In any case, the receptacles 1730 may be threaded so that a threaded coupler 175 can be secured directly therein. Still further, in some instances, the receptacles 1730 need not extend through back surface 1720, which may prevent the couplers 175 from extending into the crosshead assembly 170 and interfering with operations of the crosshead assembly 170 and/or allowing contaminants into the crosshead assembly 170. However, other embodiments might include receptacles that are through holes.

Still referring to FIGS. 2A and 2B, in the prior art reciprocating pump 100—and in most high pressure reciprocating pumps—a crosshead frame 174 is a part of a crosshead assembly 170 that converts rotational motion of the crankshaft 103 into linear, reciprocating motion of a pony rod 185. More specifically, the crosshead assembly 170 includes a connecting rod 171, a crosshead 173, and a pony rod 185. The crosshead 173 includes a connector 176 disposed within a crosshead frame 174, and the connecting rod 171 extends from the crankshaft 103 to the connector 176. The connector 176 is configured to move linearly within the crosshead frame 174, and opposite ends of the connecting rod 171 are configured to travel with the crankshaft 103 and the connector 176.

Thus, as the connecting rod 171 rotates with the crankshaft 103, the connecting rod 171 reciprocates the connector 176 within the crosshead frame 174. The connector 176 is also connected to a back side 186 of the pony rod 185 so that the pony rod 185 reciprocates with the connector 176. Meanwhile, a front side 187 of the pony rod 185 can be coupled to a reciprocating element 202 (e.g., a plunger), such as via a clamp, to drive reciprocating motion of the reciprocating element 202 that pumps fluid through the fluid end 104. Notably, during this action, the pony rod 185 and/or the crosshead 173 exert forces on the frame 368. These forces stress the frame 368 (and potentially the crosshead frame 174). Such forces may affect a structural integrity of the frame 368. For this reason, forces imparted onto the frame 368 may wear out (e.g., decrease a useful lifespan of) the frame 368 and/or cause downtime of the power end 102, such as to enable performance of a maintenance operation with respect to the frame 368, thereby reducing effective operation of the pump 100.

Figure 3:
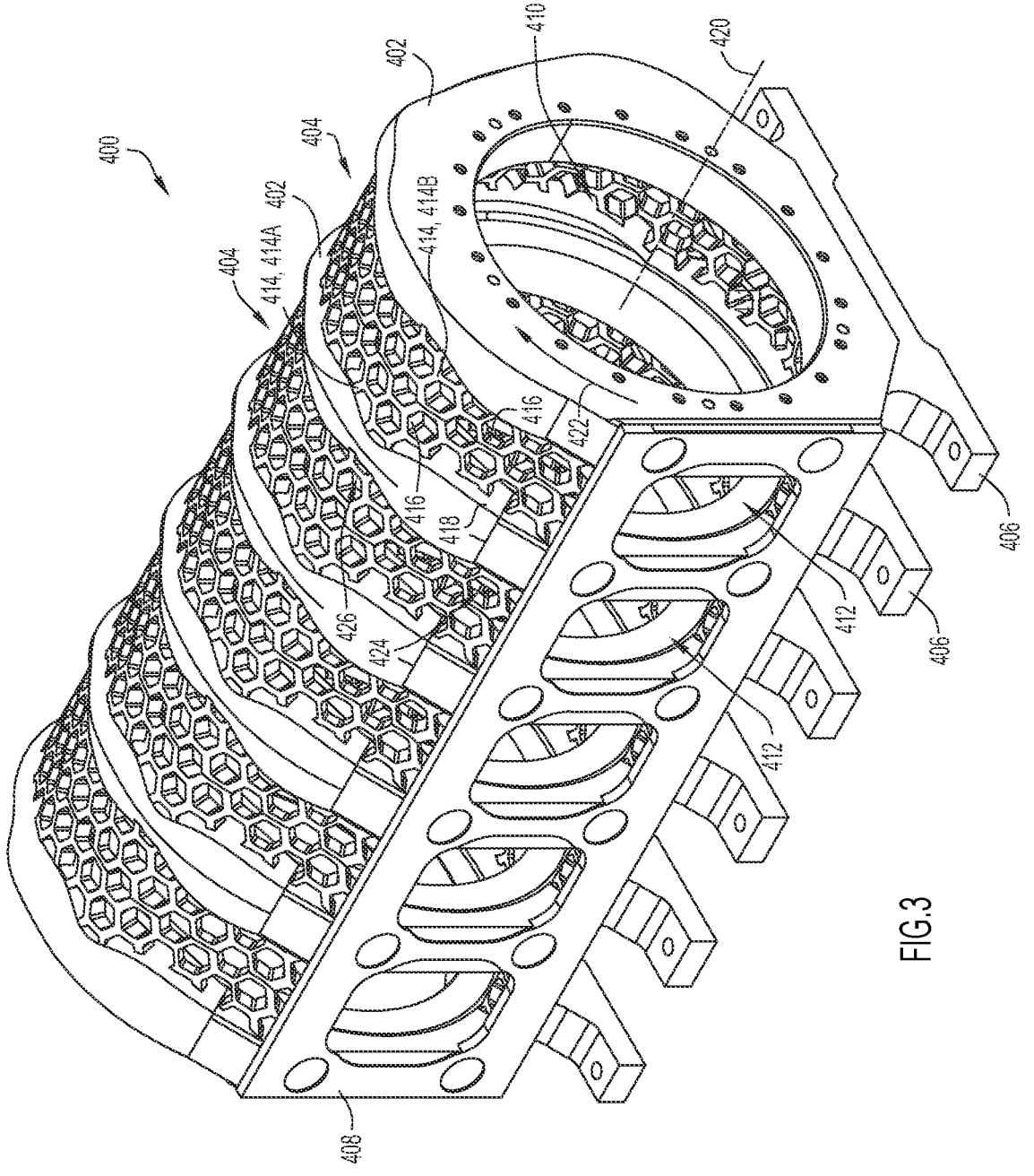
FIG. 3 is a perspective view of a power end frame of a reciprocating pump, according to an example embodiment of the present application.

FIG. 3 illustrates a perspective view of a power end frame 400 of a power end of a reciprocating pump. For visualization purposes, certain components, such as a crankshaft, a crosshead assembly, and rods, are not shown in FIG. 3. The power end frame 400 is composed of multiple rings 402 (e.g., bearing rings) and connections 404 positioned between adjacent rings 402. A stand 406 extends from the rings 402 to support and stabilize placement of the rings 402 on a surface, e.g., on a skid (not shown). For example, the stand 406 helps balance and maintain a position of the rings 402, as well as support a weight of the power end frame 400. A nose plate 408 extends from the rings 402 to enable the power end frame 400 to be coupled to a fluid end (e.g., the fluid end 104).

The rings 402 and connections 404 cooperatively form an interior 411 of the power end frame 400. For example, each ring 402 defines a respective opening 410 (e.g., a crankshaft bore) in which other components (e.g., a crankshaft) of the power end may be positioned. Additionally, the rings 402 are offset from one another to form a compartment 412 (e.g., a gap, a space) between adjacent rings 402. Certain components of the power end may be positioned within the compartment 412. The openings 410 and compartments 412 collectively define the interior 411.

In the depicted embodiment, the rings 402 and the connections 404 are formed integrally with one another. For example, the power end frame 400 may be formed via an additive manufacturing process in which material is provided, such as layer by layer, and fused together. The material used during the additive manufacturing process may be more suitable (e.g., stronger) than materials used in certain other manufacturing processes, such as a molding process. In some embodiments, the stand 406 and/or nose plate 408 are also integral with the rings 402 and the connections 404. In additional or alternative embodiments, the stand 406 and/or the nose plate 408 may be separate manufactured and coupled to the integral rings 402 and connections 404.

The integral formation of the rings 402, the connections 404, the stand 406, and/or the nose plate 408 reduces a quantity of separate components to be manufactured and coupled to one another. As a result, manufacture of the power end frame 400 may be improved. For instance, the power end frame 400 may be manufactured using a single process (e.g., an additive manufacturing process), rather than multiple manufacturing processes to create separate components and subsequently coupling the components to one another. Additionally or alternatively, factors that would otherwise have to be considered, such as dimensioning and tolerancing of components, sealed engagement between component interfaces, tooling to be able to perform different manufacturing processes, stress analysis of individual components, and so forth, may no longer be relevant for a single, integral power end frame 400, thereby reducing complexity of manufacture of the power end frame 400. Furthermore, an integral power end frame 400 may have better structural integrity as compared to a power end frame composed of multiple components coupled to one another. For example, coupling of components may introduce relatively weaker areas and/or areas where stress may concentrate at the interface between the components (e.g., caused by structural discontinuities of separate components), thereby providing portions of the power end frame having reduced structural integrity. By comparison, the integral power end frame 400 would limit or avoid having to couple components to one another and would therefore avoid introducing corresponding portions with reduced structural integrity.

Still further, integrally forming the rings 402 with the connections 404, and perhaps with the stand 406 and/or the nose plate 408 as well, may reduce an amount of material used to form the power end frame 400. In turn, the reduction in material may reduce a cost associated with the additive manufacturing process (e.g., by reducing an amount of material to be purchased and/or by reducing a power consumption related to providing and fusing material together). In view of this, it may also be possible to increase a size of the power end frame and/or increase an amount of space between different parts of the power end frame 400, such as at the connections 404, without realizing an increase in material costs.

In the depicted embodiment, each of the connections 404 includes struts or segments 414 arranged to define open cells 416 that are void of material. That is, the open cells 416 expose the interior 411 (e.g., the compartments 412) to an exterior environment. In the illustrated embodiment, the open cells 416 formed by the struts 414 have a hexagonal shape and are orderly positioned relative to one another (e.g., along different rows). For instance, at least some of the struts 414 extend directly off one of the rings 402, and additional struts 414 extend off one another to form multiple the open cells 416 between adjacent rings 402, each open cell 416 having approximately the same size and shape. Such arrangement of the open cells 416 provides connections 404 that are webbed.

Additionally, to increase structural rigidity and strength of the power end frame 400, each strut 414 extending from a surface 418 of the rings 402 extends obliquely with respect to the surface 418. More specifically, in the depicted embodiment each ring 402 is positioned to align the respective openings 410 with one another such that an axis 420 extends through a center of each respective opening 410 and substantially perpendicularly relative to the surface 418 of each ring 402. The struts 414 then extend from surfaces 418 that are oriented obliquely with respect to the axis 420 (e.g., at 45 degrees).

Oblique extension of the struts 414 relative to the rings 402 may help distribute forces along the struts 414 to reduce a concentration of stress that otherwise may compromise a structural integrity of the connections 404 and/or of the rings 402. For example, during operation of the power end, a force may be produced and imparted onto a first strut 414A extending obliquely from one of the rings 402. The oblique extension of the first strut 414A relative to the surface 418 of its corresponding ring 402 may cause the first strut 414A to transmit the force to adjacent struts 414, as well as to its corresponding ring 402. The adjacent struts 414 may further transmit the force. As a result, the force initially imparted onto the first strut 414A may be distributed across several other struts 414, such as a second strut 414B that neither directly extends from the first strut 414A or from the ring 402 from which the first strut 414A extends. Therefore, although the connections 404 include several open cells 416 to reduce an amount of material used to form the connections 404, the connections 404 may still provide enough structural rigidity to withstand stress resulting from the forces produced during operation of the power end.

In certain embodiments, to further reduce an amount of material used to form the power end frame 400, each ring 402 may have a variable cross-section taken along a circumferential direction 422 of extension of the ring 402 about the opening 410 (e.g., around the axis 420). By way of example, a thickness of the ring 402 (e.g., a dimension of the ring 402 taken along the axis 420) may vary along the circumferential direction 422. As a result, the ring 402 includes a first portion 424 (e.g., a base portion) having an increased thickness and a second portion 426 (e.g., a neck portion) having a reduced thickness. The reduced thickness of the second portion 426 reduces an amount of material used to form the ring 402, such as in comparison to a ring having the same thickness (e.g., the increased thickness of the first portion 424) throughout. At least one strut 414 extends from the second portion 426 to increase a structural integrity of the power end frame 400 at the second portion 426. That is, the connection of the strut 414 to the second portion 426 increases the capability of the ring 402 to withstand stress at the second portion 426 even though the thickness of the second portion 426 is less than that of the first portion 424. As such, less material is used to form the ring 402, while the connections 404 coupled to the ring 402 provide sufficient structural rigidity for the power end frame 400. One or more struts 414 may also extend from the first portion 424 to enable the connections 404 to provide sufficient coverage between adjacent rings 402.

Figure 4:
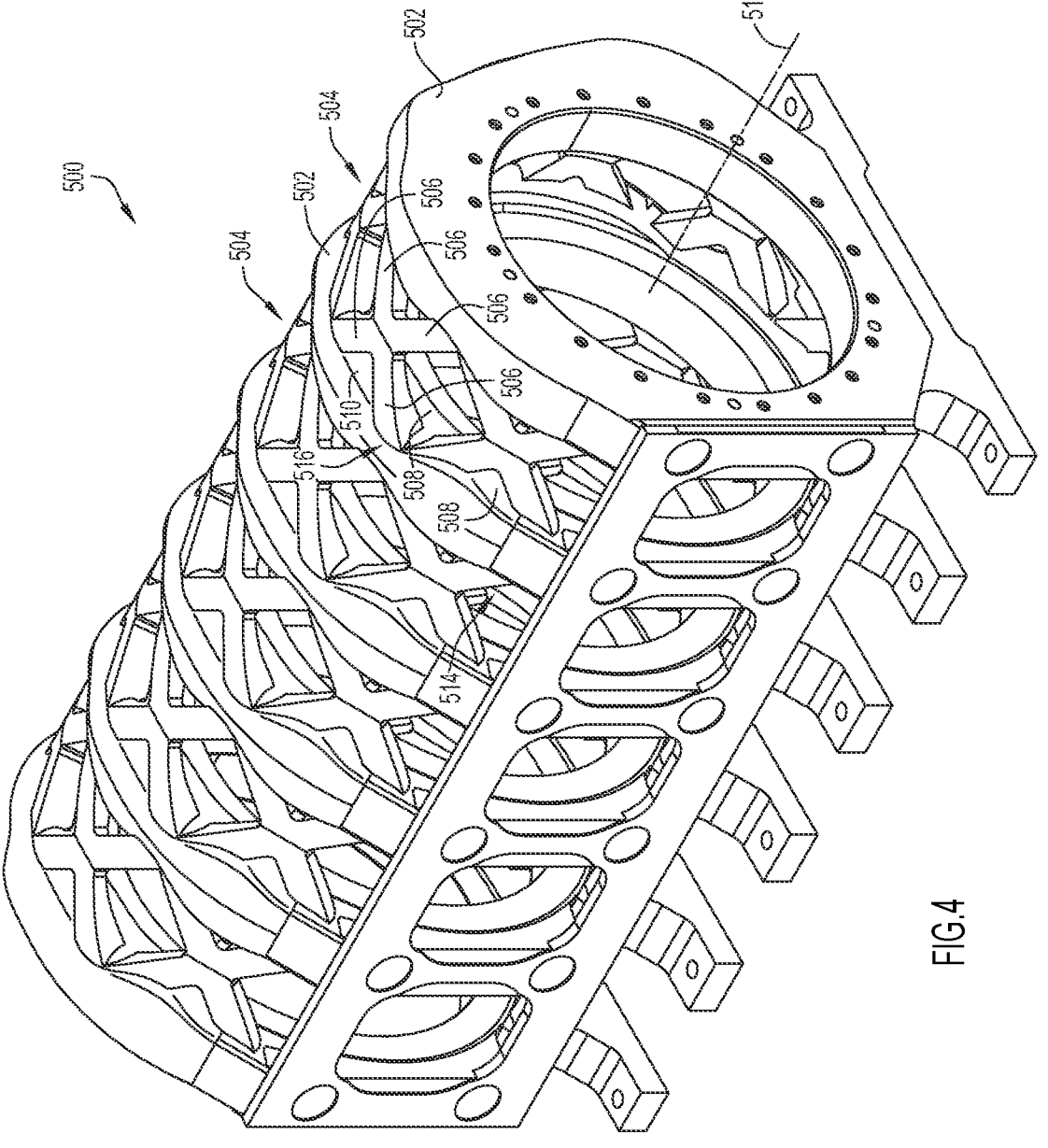
FIG. 4 is a perspective view of a power end frame of a reciprocating pump, according to another example embodiment of the present application.

It should be noted that in additional or alternative embodiments, a power end frame may have connections with open cells having a different shape. FIG. 4 is a perspective view of a power end frame 500 having rings 502 (e.g., bearing rings) and connections 504 extending between and integral with adjacent rings 502. The connections 504 include struts 506 that are arranged to define open cells 508 having a quadrilateral (e.g., rectangular, rhomboid) shape and/or a triangular shape and that are positioned in an orderly manner (e.g., around a circumference of the rings 502). For example, a first pair of struts 506 extends obliquely off a surface 510 of one of the rings 502 (e.g., obliquely relative to an axis 512 extending through the centers of the rings 502) to connect to or intersect with one another. Similarly, a second pair of struts 506 extends obliquely off a surface 510 of an adjacent ring 502 to connect to or intersect with one another and with the first pair of struts 506 between the adjacent rings 502. The connection between the first pair of struts 506 and the second pair of struts 506 forms the open cells 508 having the quadrilateral shape and/or the triangular shape.

In addition to forming the illustrated open cells 508, the oblique extension of the struts 506 from the rings 502 enables the connections 504 to provide sufficient structural rigidity and strength for the power end frame 500. For instance, the struts 506 distribute forces to reduce concentration of stress. Moreover, each ring 502 includes a first portion 514 having an increased thickness and a second portion 516 having a reduced thickness to reduce an amount of material used to manufacture the rings 502. At least one strut 506 extends from the second portion 516 to increase a structural integrity of the power end frame 500 at the second portion 516. Thus, a desirable structural integrity of the power end frame 500 is achieved, while limiting a cost associated with manufacture of the power end frame 500.

Figure 5:
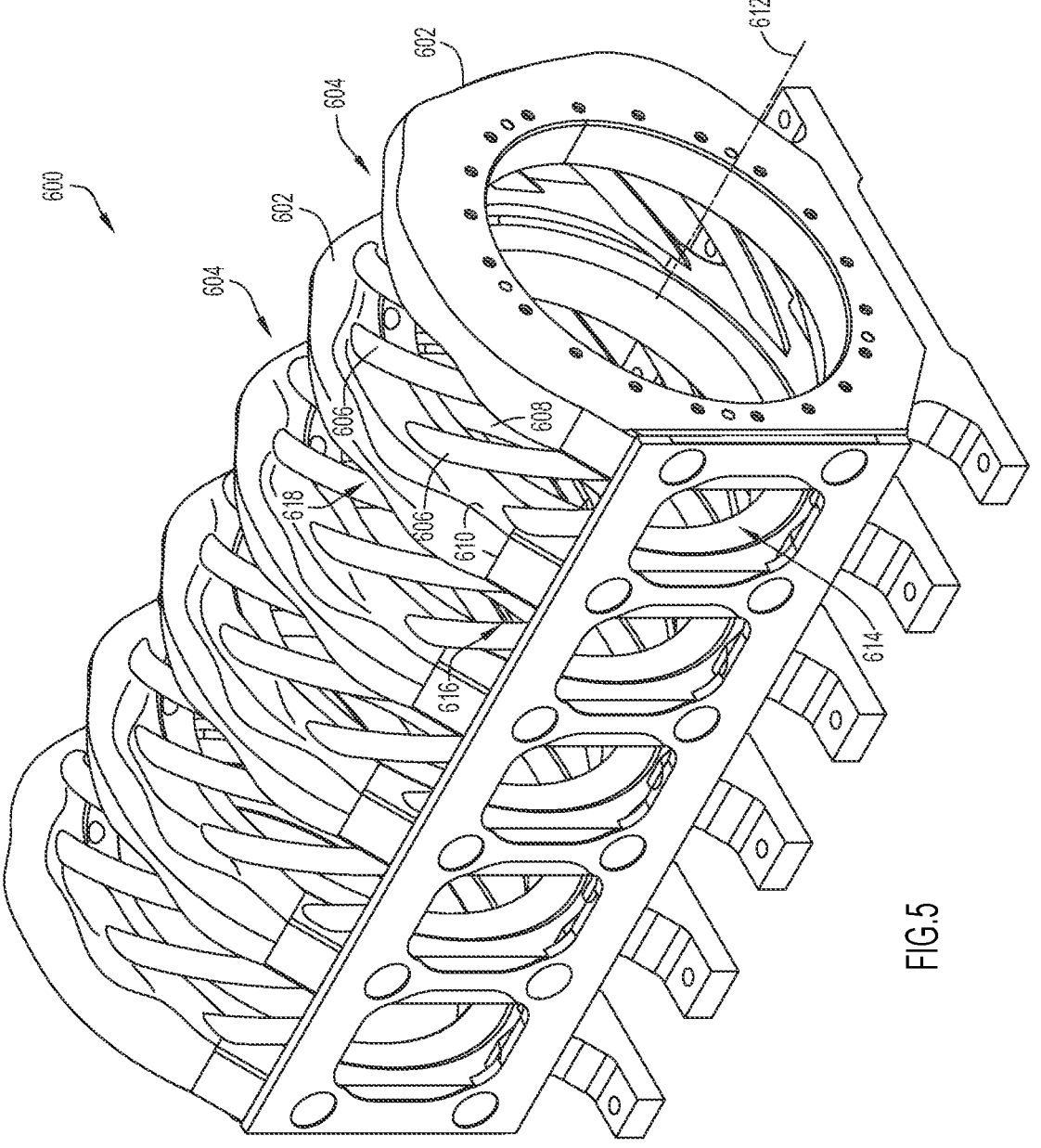
FIG. 5 is a perspective view of a power end frame of a reciprocating pump, according to yet another example embodiment of the present application.

FIG. 5 is a perspective view of a power end frame 600 having rings 602 (e.g., bearing rings) and connections 604 extending between and integral with adjacent rings 602. The connections 604 include struts 606 that are arranged to define open cells 608 having an irregular quadrilateral and/or partially helical shape and that are positioned in an orderly manner (e.g., around a circumference of the rings 602). Each strut 606 extends obliquely off surfaces 610 of adjacent rings 602 (e.g., obliquely relative to an axis 612 extending through the centers of the rings 602). That is, each individual strut 606 extends across a compartment 614 formed between adjacent rings 602 to connect to the adjacent rings 602. Additionally, each strut 606 extends substantially parallel to one another. For example, the struts 606 extend in a spiral or helical manner between the rings 602. Each ring 602 includes a first portion 616 having an increased thickness and a second portion 618 having a reduced thickness, and a strut 606 extends from the second portion 618 (e.g., from the second portion 618 of one ring 602 to the second portion 618 of an adjacent ring). The illustrated arrangement of the struts 606 provides sufficient structural rigidity and strength for the power end frame 600 to achieve a desirable structural integrity of the power end frame 600, while limiting a cost associated with manufacture of the power end frame 600.

For each of the depicted power end frames, a cover or skin may be applied (e.g., to extend across the open cells) thereon. The cover may be non-structural (e.g., does not primarily serve to increase structural stability) and may be used to maintain desirable operations. For example, lubrication may flow within the power end frame during operation, and the cover may help contain the lubrication within the power end frame.

It should be noted that a power end frame can additionally or alternatively include connections having other arrangements, such as struts that form open cells having a different shape. As an example, the struts may form open cells having non-depicted curved (e.g., circular, oval), asymmetrical, or irregular shapes, and/or the struts may form open cells that are positioned in a non-orderly manner. Indeed, the struts may be randomly positioned and/or may form open cells having a random arrangement. The struts may also be oriented in any suitable manner, such as extending perpendicularly from a corresponding ring and/or extending in a curved manner to form a desirably shaped open cell. Additionally, a power end formed in accordance with the techniques presented herein need not include identical patterns of struts/connections between adjacent rings and can include different patterns between different sets of adjacent rings. In fact, alternate patterns might be preferred in different ring arrangements, for example, if the rings of a power end frame are not all aligned with each other (e.g., with some rings being offset to receive offset journals of a crankshaft). As another example, some struts may be arranged (e.g., discontinuous) to provide open cells (e.g., having a greater size, having a particular shape) that enable access to the interior of the power end frame, such as for performing maintenance (e.g., repair, inspection) and/or assembly of components within the interior of the power end frame.

Figure 6:
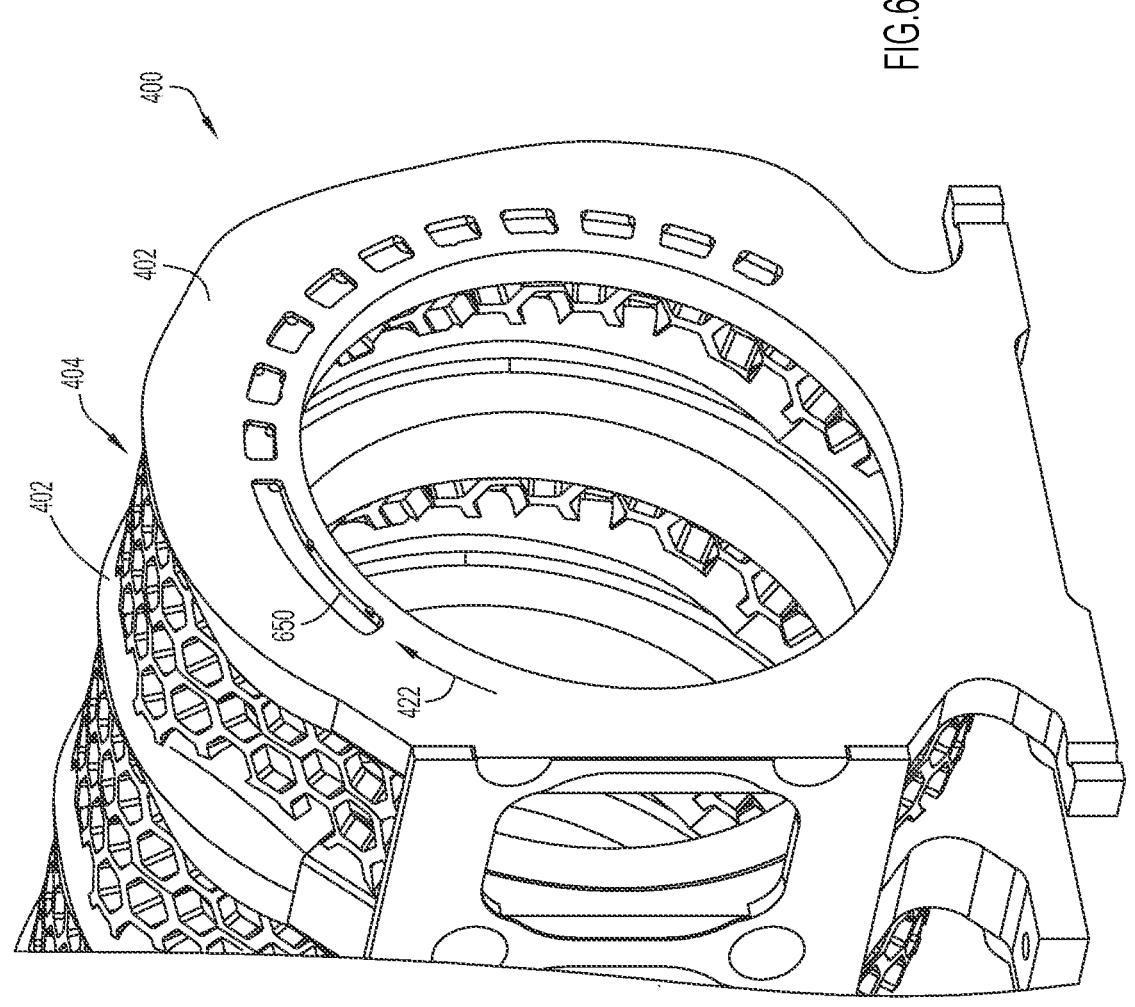
FIG. 6 is a perspective view of rings of the power end frame of FIG. 3 showing a cross-sectional view of one of the rings, according to an example embodiment of the present application.

Still further, while FIGS. 4-6 depict power end frames with six rings, this is not intended to be limiting in any manner and, in other embodiments, power end frames formed in accordance with the techniques presented herein may include any number of rings connected by integral connections/struts. Additionally or alternatively, a portion of a power end frame might be formed in accordance with the techniques presented herein and coupled to another portion of a power end frame. For example, a first integrally formed three-ring frame section might be coupled to a second integrally formed three-ring frame section to form a power end frame assembly. As another example, a top portion of a power end frame might include top portions of rings and integrally formed connections/struts, and the top portion of the power end frame assembly may be coupled to a bottom portion of the power end frame assembly that includes bottom portions of rings and integrally formed connections/struts. Other such variations and permutations are also within the scope of the present application.

FIG. 6 is a perspective view of the rings 402 of the power end frame 400 that includes a sectional view of one of rings 402. However, techniques discussed in connection with FIG. 6 may be applied to any power end frame, such as to the rings 502 of the power end frame 500 and/or to the rings 602 of the power end frame 600. Each ring 402 includes channels 650 extending generally along the circumferential direction 422 within the ring 402. The channels 650 are internal to the ring 402 and do not extend to a surface from which the connections 404 extend to avoid a geometric irregularity that may cause stress to concentrate adjacent to the connections 404. The channels 650 cause the ring 402 to be at least partially hollow. The channels 650 further reduce an amount of material used to manufacture each ring 402. Moreover, a fluid may be directed through the channels 650. That is, a fluid may circulate through each ring 402 via the channels 650. For instance, the fluid may include a lubricant or a coolant (e.g., oil) to facilitate operation of the power end frame 400. Thus, the channels 650 may provide additional benefits related to manufacture of the power end frame 400, as well as related to operation of the power end frame 400.

In some embodiments, a strut (e.g., of the struts 414, of the struts 506, of the struts 606) of a power end frame may also include a similar channel. That is, the strut may be hollow. For example, the hollow structure of the strut may enable a lubricant to be directed therethrough, such as between rings, and/or may reduce a cost of manufacture of the power end frame (e.g., by reducing an amount of material used to manufacture the power end frame). In additional or alternative embodiments, a strut may be perforated and may include openings formed therethrough.

Figure 7:
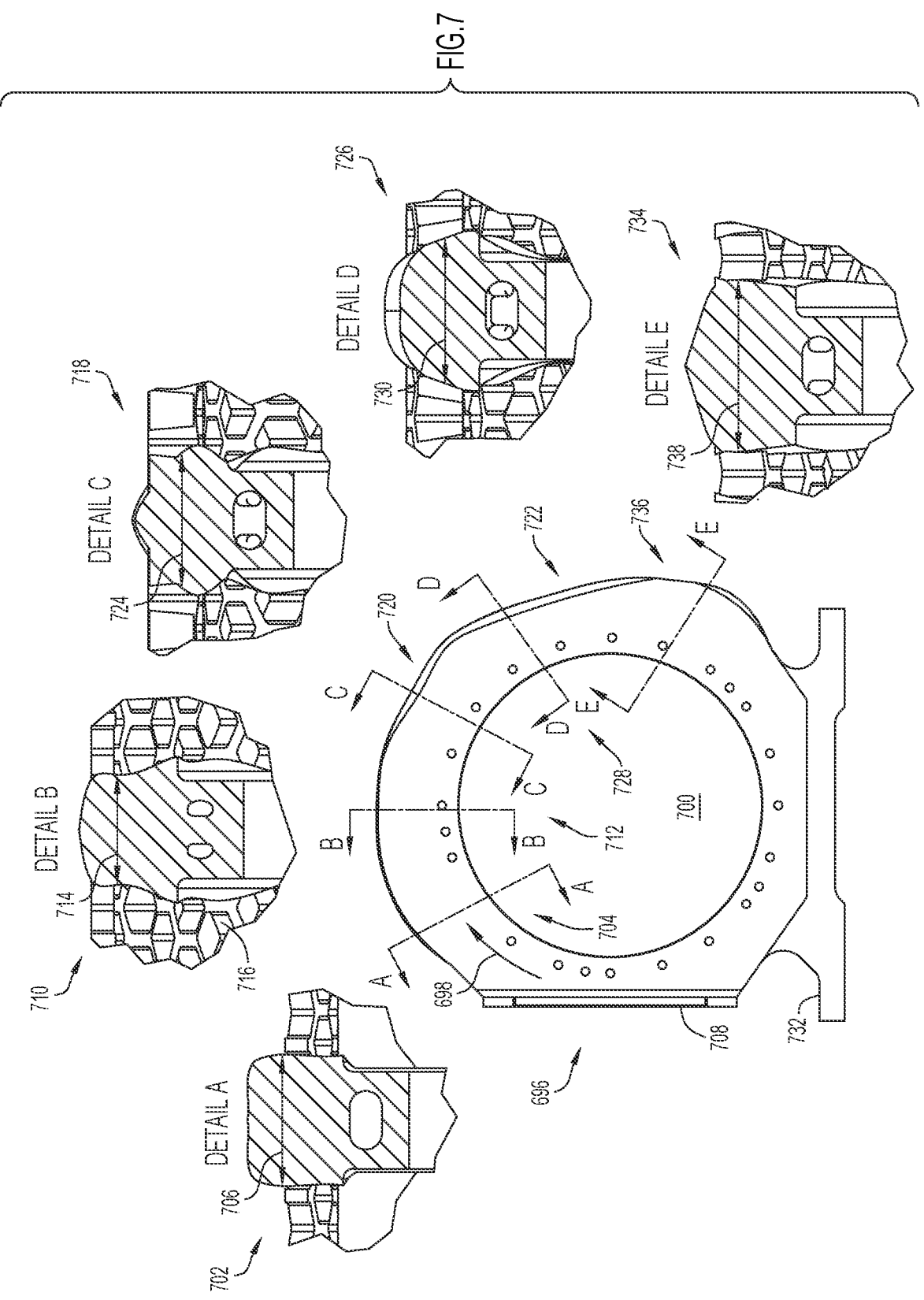
FIG. 7 is a side view of a ring of a power end frame, along with cross-sections of different portions of the ring, according to an example embodiment of the present application.

FIG. 7 illustrates a ring 696 (e.g., a bearing ring) of a power end frame, as well as several different cross-sectional views of the ring 696. In particular, the different cross-sectional views of the ring 696 are taken along planes that are oriented perpendicular to a circumferential direction 698 of the ring 696 about an opening 700. Such cross-sections of the ring 696 are different from one another and vary along the circumferential direction 698.

A first view 702 illustrates a cross-section of a first portion 704 of the ring 696. The first portion 704 includes a first thickness 706 (e.g., an intermediate thickness). As an example, during operation of the power end, forces may be imparted at the first portion 704 due to the proximity of the first portion 704 with respect to an interface between the power end (e.g., a nose plate 708) and a fluid end. Thus, the first thickness 706 is sufficiently large to withstand stress caused by such forces.

A second view 710 illustrates a cross-section of a second portion 712 of the ring 696. The second portion 712 is adjacent to the first portion 704, but is positioned farther away from the interface between the power end and the fluid end. Therefore, the second portion 712 may experience less stress during operation of the power end. For this reason, the second portion 712 has a second thickness 714 (e.g., a reduced thickness) that is less than the first thickness 706 and still provides sufficient structural integrity to withstand stresses produced during operation of the power end. Moreover, connections 716 (e.g., struts of the connections 716) extend from the second portion 712 and further increase the structural rigidity at the second portion 712.

A third view 718 illustrates a cross-section of a third portion 720 of the ring 696. The third portion 720 is adjacent to the second portion 712 and is positioned even farther away from the interface between the power end and the fluid end. However, the third portion 720 is positioned more adjacent to a side 722 (e.g., a backside) of the power end that may experience more stress during operation of the power end. As such, the third portion 720 may have a varying third thickness 724 (e.g., greater than the second thickness 714) to transition from the second portion 712 toward the side having more stress.

A fourth view 726 illustrates a cross-section of a fourth portion 728 of the ring 696. The fourth portion 728 is adjacent to the third portion 720 and is positioned at the side 722 at which more stress may be experienced during operation of the power end. Thus, the fourth portion 728 has a fourth thickness 730 (e.g., an additional intermediate thickness) that is greater than the second thickness 714 of the second portion 712. For example, the fourth thickness 730 may be substantially similar to the first thickness 706. Additionally, the fourth portion 728 is positioned toward a stand 732 connected to the ring 696, where substantial stress (e.g., a weight of the ring 696) may be experienced both during operation of the power end and when the power end is not in operation. For this reason, the fourth thickness 730 may somewhat vary to transition from the third portion 720 toward the stand 732.

A fifth view 734 illustrates a cross-section of a fifth portion 736 of the ring 696. The fifth portion 736 is adjacent to the stand 732 where substantial stress may be experienced. Therefore, the fifth portion 736 includes a fifth thickness 738 (e.g., an increased thickness) substantially greater than each of the first thickness 706, the second thickness 714, the third thickness 724, and the fourth thickness 730. Thus, the fifth thickness 738 provides a sufficient structural integrity for the fifth portion 736 to withstand the substantial stress experienced near the stand 732.

As such, the cross-section of the ring 696 varies at different parts of the ring 696, such as to provide a geometry or configuration (e.g., a thickness) to withstand corresponding stresses while limiting a total amount of material used to manufacture the ring 696. Thus, the cross-section of the ring 696 is selectively varied to facilitate desirable manufacture of the ring 696, as well as to provide suitable structural integrity at different parts of the ring 696. By way of example, the ring 696 may be manufactured by using a design process (e.g., topology optimization) that provides a geometry, including a cross-sectional shape, based on stress simulation for different parts of the ring 696. In some embodiments, such a design process may be applied to manufacture other parts of a power end frame, such as to provide various arrangements of struts to establish suitably shaped and sized open cells therebetween.

Figure 8:
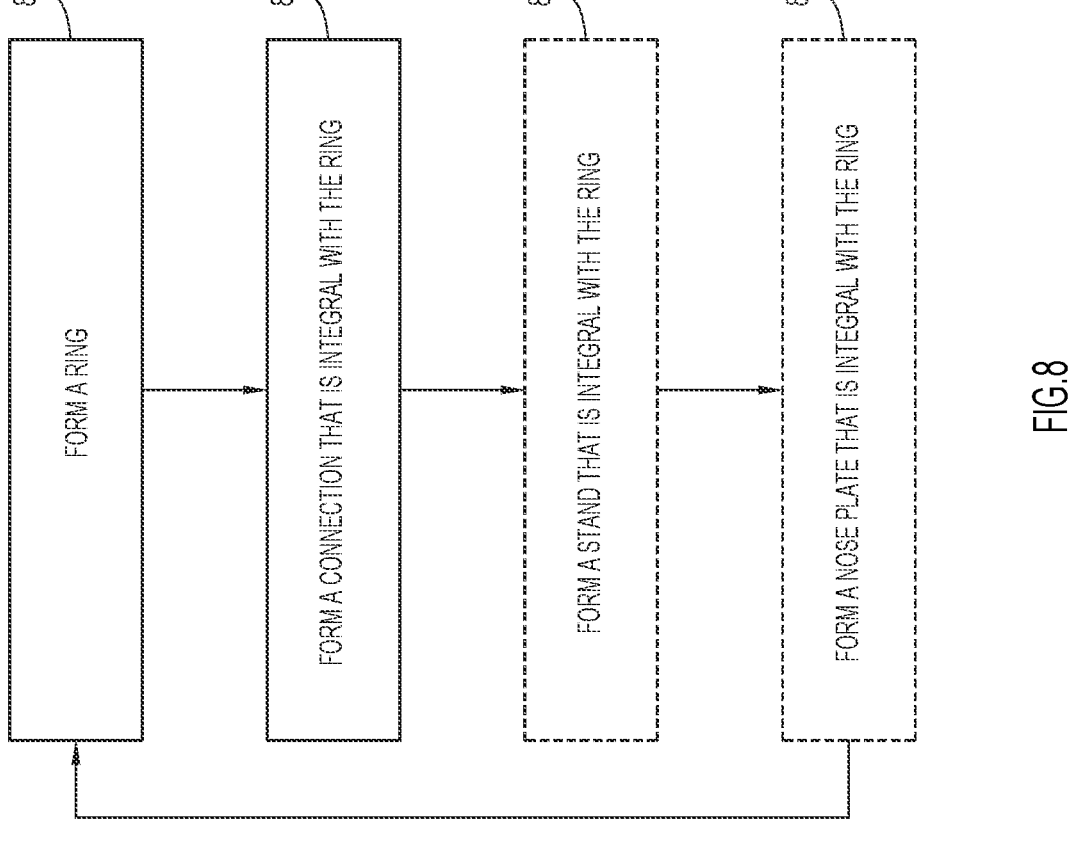
FIG. 8 is a flowchart of a method for manufacturing a power end frame, according to an example embodiment of the present application.

FIG. 8 is a flowchart of a method 800 for manufacturing a power end frame of a reciprocating pump, such as any of the power end frames 400, 500, 600 discussed herein. It should be noted that the method 800 may be performed differently than depicted herein. For example, an additional operation may be performed, a depicted operation may be performed differently, depicted operations may be performed in a different order, and/or a depicted operation may not be performed.

At block 802, a ring (e.g., a bearing ring) is formed. For example, the ring is formed using an additive manufacturing process in which layers of material are sequentially formed and fused to one another. The ring extends around an opening. In some embodiments, the ring includes a variable cross-section along its extension around the opening. For example, a certain portion of the ring may include a reduced thickness. In additional or alternative embodiments, the ring includes a channel extending therein such that the ring is partially hollow.

At block 804, a connection integral with the ring is formed. For instance, the additive manufacturing process enables formation of the connection to extend from the ring. The connection includes struts that define a plurality of open cells to reduce an amount of material used to manufacture the connection. Some of the struts extend from the ring at oblique angles to enable the struts to distribute forces that may be imparted during operation of the reciprocating pump, thereby increasing a structural integrity of the power end frame. Additionally, for a ring having a portion with reduced thickness, at least one strut extends from the portion to provide sufficient structural integrity of the power end frame at the portion. As such, the arrangement of the connection relative to the ring enables the power end frame to withstand stress during operation of the reciprocating pump.

At block 806, a stand integral with the ring is formed. As an example, the additive manufacturing process enables formation of the stand to extend from the ring. The stand is configured to support a weight of the power end frame to secure placement of the power end frame to a surface.

At block 808, a nose plate integral with the ring is formed. For instance, the additive manufacturing process also enables formation of the nose plate to extend from the ring. The nose plate is configured to couple to a fluid end. In at least some embodiments, blocks 806 and/or 808 are optional.

In some embodiments, multiple rings and connections that are integral with one another may be formed using a similar manufacturing technique. For instance, the additive manufacturing process provides layers that alternately form rings and connections that are integral with one another. Accordingly, connections extend between and are integral with adjacent rings, and rings extend between and are integral with adjacent connections. Indeed, different portions of the ring, of the connection, of the stand, and/or of the nose plate may be sequentially formed to manufacture the power end frame (e.g., layer by layer in multiple iterations). As such, various operations of the method 800 may be repeated. The integral formation of the power end frame may simplify the manufacturing process and/or maintain a desirable structural integrity of the power end frame, such as in comparison with a power end frame having multiple components that are separately manufactured and coupled to one another, which may introduce relatively weaker areas at the interface between separate components. However, in alternative embodiments, at least part of the power end frame may not be integral with a remainder of the power end frame. By way of example, the stand and/or the nose plate may be formed separately and then coupled to the ring.

While the disclosure has been illustrated and described in detail and with reference to specific embodiments thereof, it is nevertheless not intended to be limited to the details shown, since it will be apparent that various modifications and structural changes may be made therein without departing from the scope and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Similarly, it is intended that the present disclosure cover the modifications and variations of this disclosure that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present disclosure to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the disclosure.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

What is claimed is:

1. A power end frame of a reciprocating pump, the power end frame comprising:
   a first ring;
   a second ring; and
   a plurality of connections extending between the first ring and the second ring, wherein the first ring, the second ring, and the plurality of connections are integral with one another, the plurality of connections comprises a first strut and a second strut extending from the first ring, the first strut has a first longitudinal axis and the second strut has a second longitudinal axis, and the first longitudinal axis and the second longitudinal axis extend obliquely from the first ring toward one another to form an open cell between the first strut and the second strut.

2. The power end frame of claim 1, wherein the first strut and the second strut connect with one another.

3. The power end frame of claim 1, wherein the first ring comprises a first opening and the second ring comprises a second opening, the first opening and the second opening being aligned with one another such that an axis extends through a center of the first opening and a center of the second opening, and each of the first longitudinal axis and the second longitudinal axis extends obliquely with respect to the axis.

4. The power end frame of claim 1, wherein the open cell formed by the first strut and the second strut comprises a quadrilateral shape, a triangular shape, a hexagonal shape, a curved shape, or any combination thereof.

5. The power end frame of claim 1, wherein the first ring, the second ring, or both comprises an internal channel configured to receive a fluid.

6. The power end frame of claim 1, wherein the plurality of connections comprises a third strut extending from the second ring and intersecting at least one of the first strut or the second strut between the first ring and the second ring.

7. The power end frame of claim 1, wherein the plurality of connections comprises a third strut extending from the first ring, and the third strut and the first strut are parallel to one another.

8. The power end frame of claim 1, comprising a nose plate integral with and extending from the first ring and from the second ring, wherein the nose plate is configured to couple to a fluid end of the reciprocating pump.

9. A method of manufacturing a power end frame of a reciprocating pump, the method comprising:
   forming a plurality of rings, including a first ring and a second ring; and
   forming a plurality of connections that extend between the first ring and the second ring such that the plurality of connections, the first ring, and the second ring are integral with one another, wherein the plurality of connections comprises a first strut and a second strut extending from the first ring, the first strut has a first longitudinal axis and the second strut has a second longitudinal axis, and the first longitudinal axis and the second longitudinal axis extend obliquely from the first ring toward one another to form an open cell between the first strut and the second strut.

10. The method of claim 9, wherein the plurality of rings and the plurality of connections are formed via additive manufacturing.

11. The method of claim 9, wherein forming the plurality of rings comprises forming the first ring having a portion of reduced thickness, and forming the plurality of connections comprises forming the first strut to extend from the portion of reduced thickness of the first ring.

12. The method of claim 9, wherein forming the plurality of connections comprises forming a third strut that extends from the second ring, wherein the third strut has a third longitudinal axis that extends obliquely from the second ring.

13. The method of claim 9, comprising forming a nose plate integral with and extending from the plurality of rings, wherein the nose plate is configured to couple to a fluid end of the reciprocating pump.

14. The method of claim 9, comprising forming a stand integral with and extending from the plurality of rings, wherein the stand is configured to support the plurality of rings on a surface.

15. A power end frame of a reciprocating pump, the power end frame comprising:
   a plurality of rings; and
   a plurality of connections integral with the plurality of rings, wherein the plurality of connections comprises a plurality of struts extending between adjacent rings of the plurality of rings, and each strut of the plurality of struts includes a first end coupled to a respective first ring of the plurality of rings and a second end coupled to a respective second ring of the plurality of rings, the first end being circumferentially offset from the second end about the plurality of rings such that a longitudinal axis of each strut extends obliquely from the respective first ring to the respective second ring.

16. The power end frame of claim 15, wherein openings of the plurality of rings are aligned with one another such that an axis extends through a center of the openings, and a ring of the plurality of rings has a variable cross-section along an outer perimeter taken along planes that are perpendicular to a direction of extension of the ring about its opening.

17. The power end frame of claim 16, wherein the ring of the plurality of rings comprises a first portion at a first location along the outer perimeter having a first thickness and a second portion at a second location along the outer perimeter having a second thickness, the second thickness being less than the first thickness.

18. The power end frame of claim 17, wherein a strut of the plurality of struts extends from the ring at the second portion.

19. The power end frame of claim 15, wherein the plurality of struts comprises a first strut and a second strut that are parallel to one another.

20. The power end frame of claim 15, comprising a stand integral with and extending from the plurality of rings, wherein the stand is configured to support the plurality of rings on a surface.

\*  \*  \*  \*  \*